June 2, 1970          L. J. ZUKOR          3,515,475
APPARATUS FOR VIEWING COINS OR THE LIKE
Filed Dec. 30, 1966          3 Sheets-Sheet 1
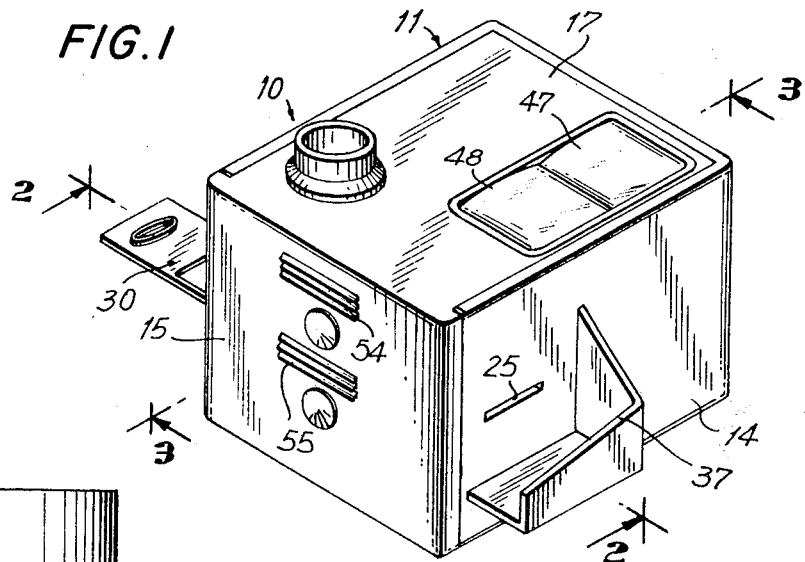
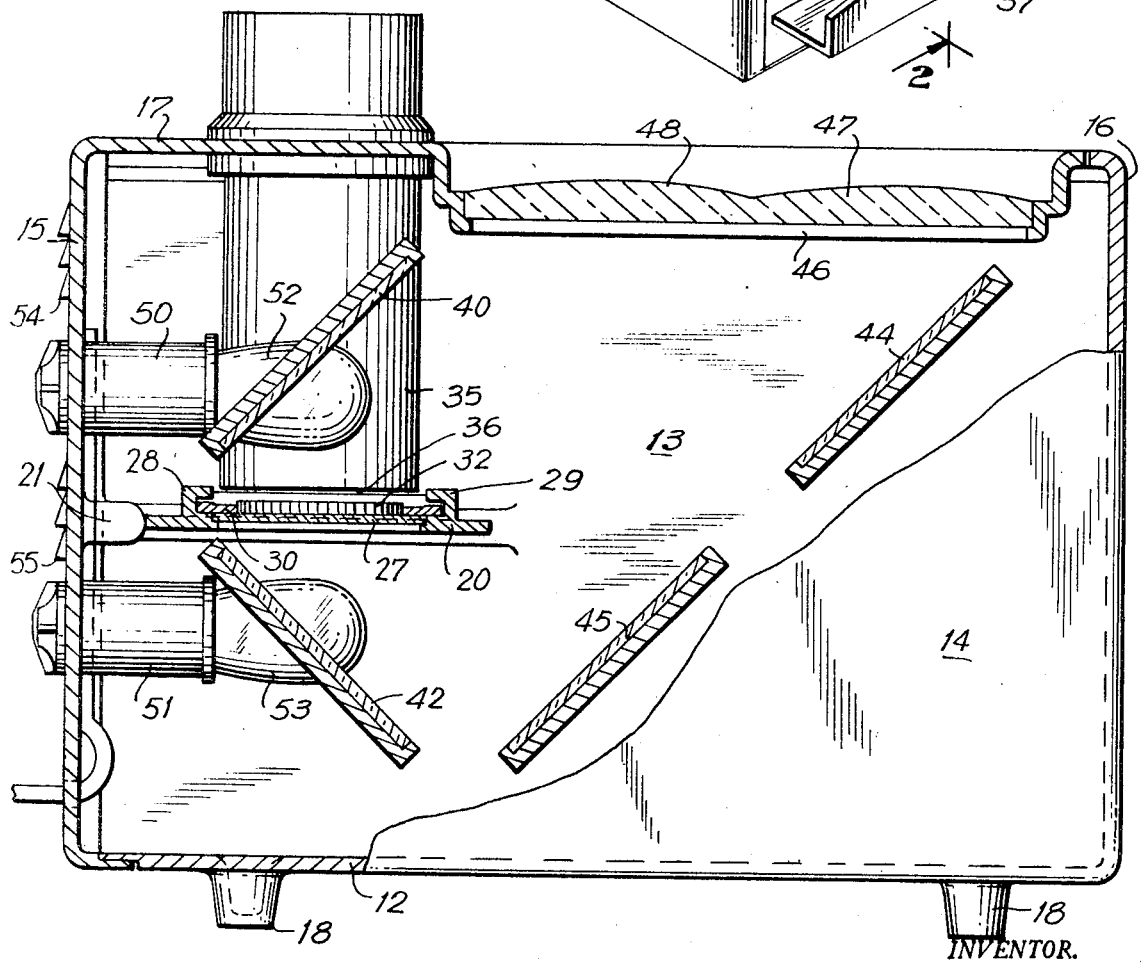
INVENTOR.
LEE J. ZUKOR
BY *Gordon L. Lilling*
ATTORNEY June 2, 1970 L. J. ZUKOR 3,515,475
APPARATUS FOR VIEWING COINS OR THE LIKE
Filed Dec. 30, 1966 3 Sheets-Sheet 2
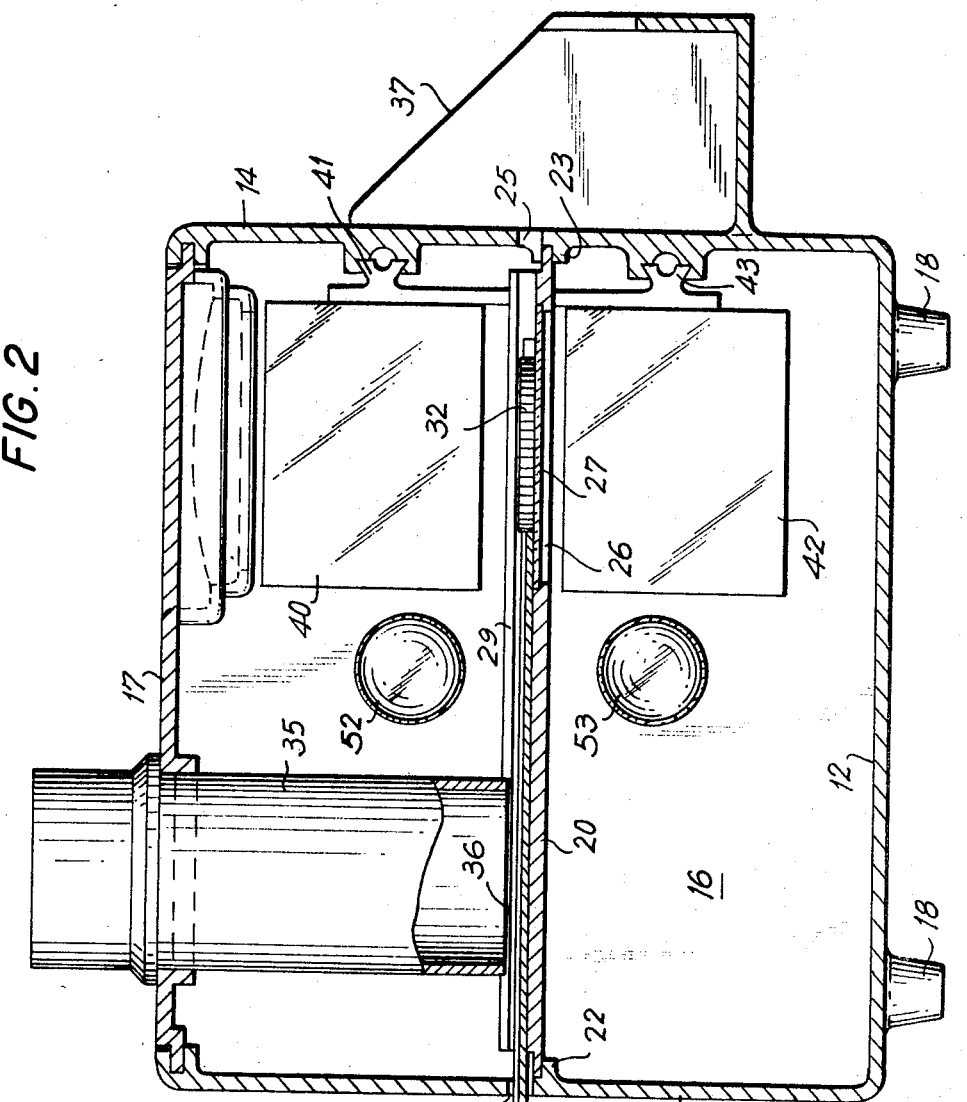
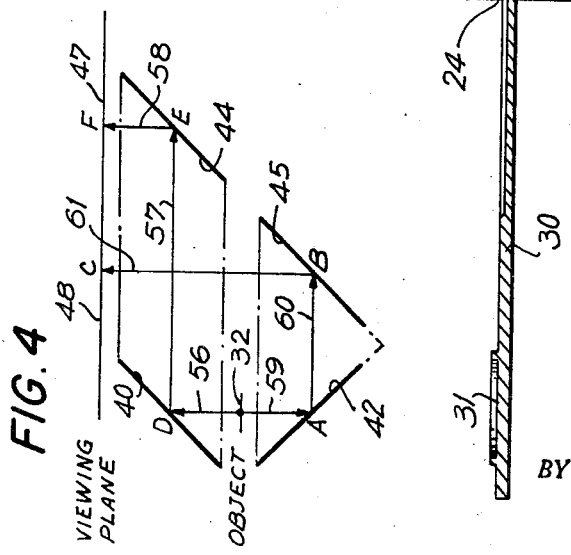
INVENTOR.
LEE J. ZUKOR
BY
ATTORNEY June 2, 1970  L. J. ZUKOR  3,515,475
APPARATUS FOR VIEWING COINS OR THE LIKE
Filed Dec. 30, 1966  3 Sheets-Sheet 3
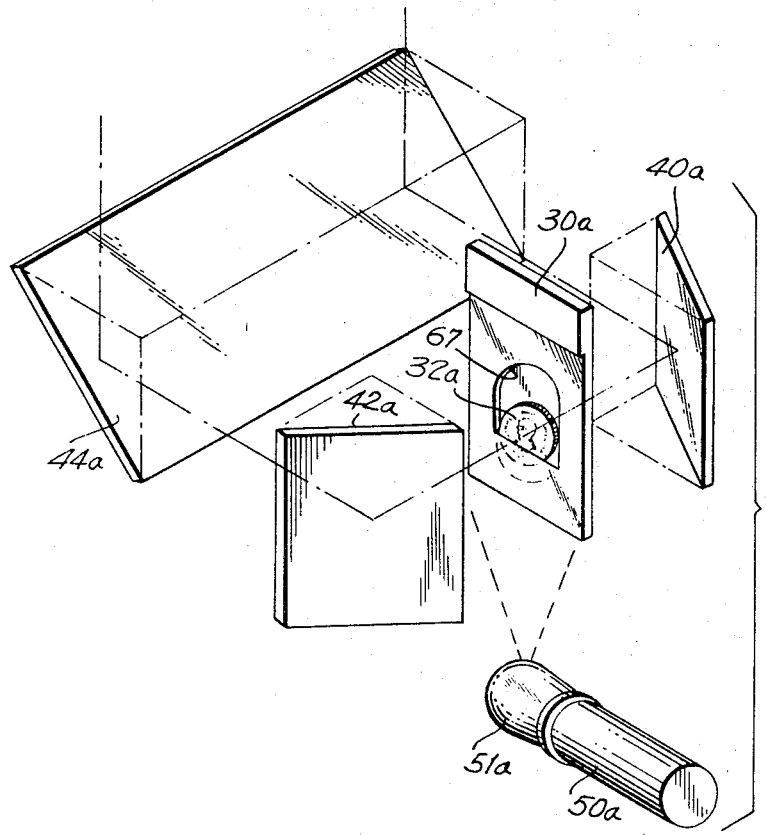
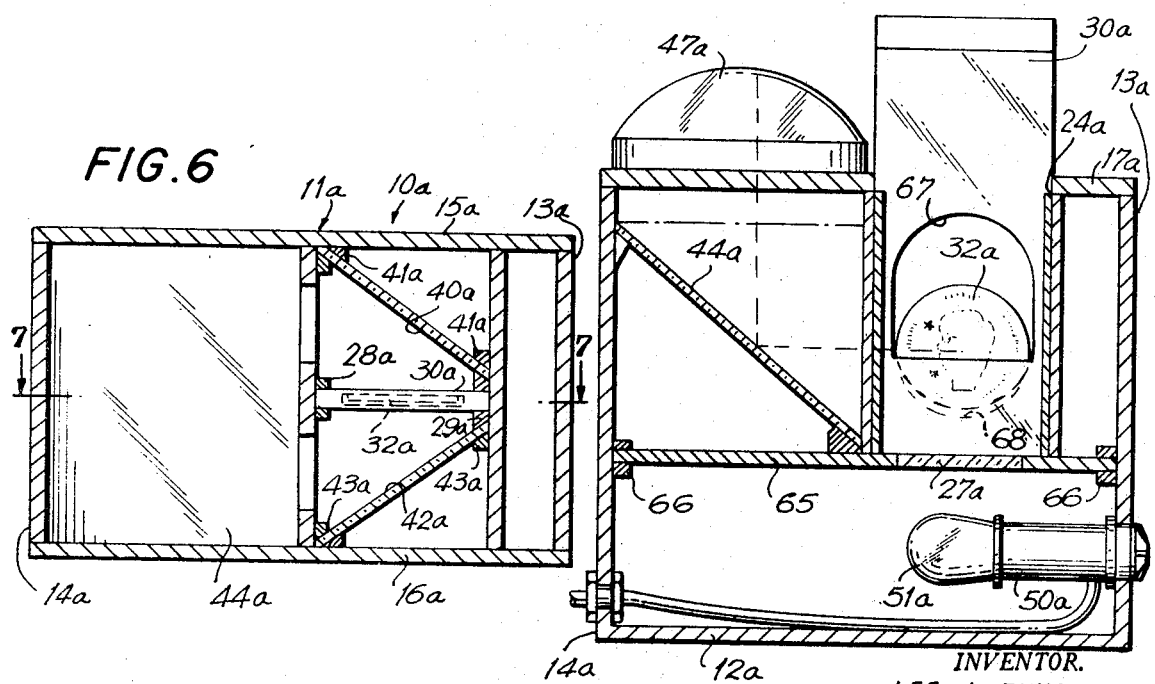
INVENTOR.
LEE J. ZUKOR
BY
ATTORNEY

United States Patent Office 3,515,475
Patented June 2, 1970

3,515,475
APPARATUS FOR VIEWING COINS OR THE LIKE
Lee J. Zukor, New York, N.Y., assignor to House of Coins, Inc., New York, N.Y., a corporation of New Jersey
Filed Dec. 30, 1966, Ser. No. 606,271
Int. Cl. G03b 21/00, 21/28
U.S. Cl. 353—78
4 Claims

ABSTRACT OF THE DISCLOSURE

A viewing apparatus for an article, such as a stamp, coin or the like. The viewing apparatus has a housing and a holder disposed within the housing intermediate two surfaces thereof for holding an article in position to be viewed. Illuminating apparatus is provided for illuminating opposite sides of the article. There is also provided a pair of reflective surfaces operable to reflect rays from opposite sides of the article to provide erect images thereof. To that end, one of the reflective surfaces is the first face of a first prism. The other reflective surface is the first face of a second prism. The viewing apparatus of the present invention has, further, exhibiting apparatus carried by the housing. There is at least one additional reflective surface comprising the second face of one of the prisms. This additional reflective surface directs light from the respective surfaces of the first pair of surfaces to the exhibiting apparatus, which is in a position to present the erect image of the opposite article sides to an observer.

---

This invention relates to a novel apparatus for viewing flat objects or discs such as coins, stamps and other similar objects. More particularly, it concerns an apparatus for viewing both sides of said objects in the same viewing plane.

In the practice of philately and numismatology, it is well known that, as a general rule, the collecting of stamps and coins requires they be carefully inspected for classification and condition prior to cataloging. It is also considered advantageous when both sides of a coin or stamp may be viewed simultaneously, thus causing such articles to be expeditiously examined in large numbers. This is also true in the inspection of many types of objects such as medals and other objects d'art.

Consequently, it is an object of the present invention to provide an apparatus whereby both sides of objects such as coins can be simultaneously and conveniently viewed.

It is another object of this invention to provide an apparatus for storing, injecting and ejecting a flat object, such as a coin, within the confines of the apparatus.

A further object of the present invention is to provide an optical system which reflects the obverse and reverse sides of a flat object into the same plane for viewing.

A further advantage of this invention is provided by the optical system which projects the images of both sides of the object in erect position so that a legend appearing on either or both surfaces may be read properly.

Other objects and advantages of the invention will become apparent from the detailed description which follows when taketn in conjunction with the accompanying drawings, and it will be apparent that changes may be made in the details of construction and arrangement of parts shown and described without departing from the spirit of the invention as expressed in the accompanying claims. I, therefore, do not wish to be limited to the exact details of construction or the arrangement of parts shown and described herein except as recited in the appended claims, as the preferred embodiments of the device have been given by way of illustration only.

Referring to the drawings:
FIG. 1 is a top perspective view of a viewing apparatus constructed in accordance with the teachings of the present invention;
FIG. 2 is a sectional view taken generally along the line 2—2 of the device of FIG. 1;
FIG. 3 is a sectional view taken generally along the line 3—3 of the device shown in FIG. 1;
FIG. 4 is a diagrammatic representation of the optical system of the device of FIGS. 1-3;
FIG. 5 is a schematic perspective illustrating a slightly modified form of optical system of the present invention;
FIG. 6 is a horizontal sectional view of a slightly modified viewing apparatus of the present invention, incorporating an optical system such as that shown in FIG. 5; and
FIG. 7 is a sectional view taken generally along the line 7—7 of FIG. 6.

While the device of the present invention has been primarily developed and employed for use in connection with the viewing of coins, and will be illustrated and described hereinafter with particular reference thereto, it is appreciated that the apparatus of this invention is not limited to use with coins, but may be employed for viewing a variety of other objects, all of which applications are intended to be comprehended herein.

Referring now more particularly to the drawings, and specifically to FIGS. 1–4 thereof, a viewing apparatus is there generally designated 10, and may include a generally boxlike housing or enclosure 11 having a bottom wall 12, front and rear walls 13 and 14 upstanding from the bottom wall, and end walls 15 and 16 upstanding from the bottom wall and extending between respective adjacent ends of the front and rear walls. A top wall 17 may extend in spaced relation over the bottom wall 12, between the upper edges of the front, rear and end walls 13–16. If desired, mounting feet 18 may depend from the underside of the bottom wall 12.

Interiorly of the housing 11, there may be provided a generally horizontal support or shelf 20, spaced vertically intermediate the bottom and top walls 12 and 17. Further, the shelf 20 may be located adjacent to the end wall 15, and may be carried thereby, as at 21. Also, the support or shelf 20 may extend between the front and rear walls 13 and 14, see FIG. 2, being suitably supported at such walls, as by brackets 22 and 23. The front wall 13 is provided with a generally horizontal thru opening or slot 24 just above, and substantially flush with the upper surface of support 20, while the rear wall 14 is similarly provided with a generally horizontal thru opening or slot 25, also substantially flush with the upper surface or support 20. As best seen in FIG. 2, the support 20, at a location adjacent to and spaced inward from the rear wall 14, may be provided with a thru opening 26; and, a light-permeable holder element, say of plastic, glass, or the like, as at 27, may be mounted in the opening 26, having its upper surface substantially flush with the upper surface of the support. In a preferred embodiment of this invention, the holder element 27 will be transparent to the wavelengths of light falling within the visible spectrum.

Also, it will be observed in FIG. 3 that the support 20 may be provided with a pair of generally parallel, spaced facing guide members or ways 28 and 29, which may extend between and terminate short of the front and rear walls 13 and 14.

An elongate, generally flat pusher 30, of strip or bar configuration, rests slidably on the upper surface of support or shelf 20, having its opposite longitudinal edges received slidably in respective ways 28 and 29 for longitudinal shifting movement along the support. At the forward end region of pusher member 30 there may be provided a finger-grasping portion 31 for manually effecting the longitudinal shifting of the pusher. By this longitudinal shifting, the pusher is slidable along the support 20 through the front and rear wall openings 24 and 25. As shown in FIG. 2, the pusher 30 is in an intermediate position of its longitudinal shifting movement, having pushed a coin or other article 32 rearward along the support 20 into a viewing position on the light-permeable element or holder 27, for purposes appearing more fully hereinafter.

Carried by the upper housing wall 17, at a location over the support 20, adjacent to the front wall 13, is a generally vertically disposed open hopper 35 of generally tubular configuration. That is, the open-ended tubular hopper 35 is mounted in a generally vertically disposed relationship in the upper wall 17, projecting upwardly therefrom and downwardly therebelow to a lower end 36 adjacent to and spaced slightly over the pusher 30. The hopper 35 may be vertically adjustable to locate its lower end 36 at a selected elevation over the pusher 30 and support 20, if desired. In use, the hopper 35 is employed to retain a stack of coins on the pusher 30, whereby retraction of the pusher to a position forward beyond the hopper enables the stack of coins to fall a distance of approximately a single-coin thickness, to the support 20, and subsequent rearward shifting of the pusher effects rearward movement of the lowermost coin to a viewing position on the holder 27, as in FIG. 2. Further rearward shifting movement of the pusher 30 serves to eject the viewed coin through the outlet opening or slot 25 in the rear wall 14 into a receptacle 37 carried exteriorly on the rear wall.

The hopper 35 may be of diameter sufficient to receive the largest sized coins. Smaller diameter tubes may be telescopically fitted and inserted one into the other, within the hopper 35. Thus, when all the tubes are in place, the hopper may receive coins of the smallest diameter. The removal of a succession of tubes will permit the receiving of any intermediate coin sizes.

Directly over the light-permeable support element or holder 27 is a suitable reflecting surface, mirror or prism 40, which may be carried by the rear wall 14, as by a connection 41. Also directly beneath the light-permeable support element or holder 27 is located a suitable reflecting surface, mirror or prism 42, which may be carried by the rear wall 14, as by a connection 43. The upper and lower reflecting surfaces 40 and 42 are best seen in FIG. 3 as being disposed obliquely to the light-permeable support element or holder 27, approximately 45 degrees with respect thereto. Further, the upper light-reflective surface 40 faces obliquely downwardly toward the support element or holder 27 and toward the housing end wall 16. The lower reflective surface 42 faces obliquely upwardly toward the support element or holder 27 and the housing wall 16. The reflective surfaces 40 and 42 are thus disposed in planes generally normal to each other.

Spaced horizontally from the upper reflective surface 40 toward the housing end wall 16 is an additional reflective surface 44, such as a mirror or prism, while an additional reflective surface 45, a mirror or prism, is spaced horizontally from the lower reflective surface 42 toward the housing end wall 16. The reflective surfaces 44 and 45 may be disposed obliquely, say facing obliquely upwardly and toward housing end wall 15. Further, the additional reflective surfaces 44 and 45 may be displaced horizontally with respect to each other, and lie in substantially the same oblique plane, surface 44 being generally parallel to its horizontally displaced upper surface 40, and surface 45 being in a plane generally normal to its horizontally displaced lower reflective surface 42.

Directly over the additional reflective surfaces 44 and 45 the upper housing wall 17 may be provided with a thru opening 46 carrying suitable exhibit means, say in the nature of a pair of adjacent magnifying lenses 47 and 48, which may be formed integrally, as illustrated, or otherwise if desired.

There are may mounted in the housing 11, say carried by the housing end wall 15, a pair of upper and lower illuminating means 50 and 51, respectively carrying lamps 52 and 53 in position to illuminate the upper and lower surfaces of a coin or article 32 in a viewing station. If desired, the housing 11 may be ventilated, as by vents 54 and 55 in housing end wall 15 adjacent to lamps 52 and 53.

As best seen in FIG. 4, an article 32 to be observed is interposed between upper and lower reflective surfaces 40 and 42. Light rays from the article 32 are reflected upwardly, as at 56 to upper reflective surface 40, and thence horizontally, as at 57 to additional upper reflective surface 44. From surface 44 the light rays are again reflected upwardly, as at 58 to the viewing screen or lens 47. From the underside of article 32 light rays are reflected downwardly, as at 59 to surface 42, and thence horizontally, as at 60, to additional reflective surface 45. From the latter reflective surface, the light rays are reflected vertically upwardly, as at 61 to the exhibition lens or viewing screen 48. Thus, opposite sides or faces of the article 32 are displayed simultaneously on the display means 47, 48 for convenience and speed of examination.

As stated previously, this invention provides means for optically transmitting the images of both the obverse and reverse sides of an object. In the embodiment of FIGS. 1–4, these means comprise four reflective surfaces, 40, 42, 44 and 45, registering and cooperating to form a pair of air prisms. The reflective surfaces 42 and 45 constitute a right isosceles or Porro prism. The reflective surfaces 40 and 44 constitute a rhomboidal prism of the type generally employed in periscopes. The latter will erect the image on both its axes whereas the former will erect the image on one axis only.

In an alternate embodiment of this invention, illustrated in FIGS. 5–7, a combination of reflective surfaces may be employed, as best seen in FIG. 5, to form the equivalent of two rhomboidal air prisms thus serving to erect the images of both the obverse and reverse sides of an object on both its axes.

Referring now more particularly to the embodiment of FIGS. 5–7, the device is there generally designated 10a, and includes a generally boxlike housing or enclosure 11a having a bottom wall 12a, front and rear walls 13a and 14a upstanding from the bottom wall, and opposite ends walls 15a and 16a upstanding from the bottom wall extending between the front and rear walls. A top wall 17a extends between the upper edges of the front, rear and end walls.

Interiorly of the housing 11a, there is provided a generally horizontal internal wall 65, supported by any suitable means, such as bracket 66, and formed at one location with a light-permeable support element 27a. Mounted below the internal wall 65, beneath the light-permeable element 27a may be electrical illuminating means 50a, say carrying a lamp 51a.

Directly over the light-permeable support element 27a, the housing top wall 17a may be provided with a thru opening or slot 24a. An elongate, generally vertically disposed holder member or bar 30a is mounted for vertical reciprocation through the top wall opening 24a, say being guided by suitable way means 28a and 29a internally of the housing 11a. The holder member or bar 30a may be formed of light-permeable material and provided with a thru opening 67 having therein an upwardly facing groove 68. A coin or article 32a may be engaged in the opening 67 of holder 30a, the lower edge margin of the coin being received in the groove 68, to support the coin in vertical disposition within the viewing position shown in FIGS. 6 and 7, and retracted upwardly for removal and replacement of the article 32a.

On opposite sides of the holder opening 67, when the holder is inserted downward through slot 24a, there are mounted in the housing 11a a pair of reflective surfaces 40a and 42a, held in position by suitable mounting means 41a and 43a, best seen in FIG. 6. The reflective surfaces 40a and 42a are each disposed obliquely, the former facing obliquely toward the article holder 30a and faces obliquely toward the latter and the housing wall 14a.

At a location interiorly of the housing 11a, between the reflective surfaces 40a and 42a, there is provided an additional reflective surface 44a, facing obliquely toward both reflective surfaces 40a and 42a and the housing top wall 17a. Directly over the additional reflective surface 44a, mounted in the housing top wall 17a, there may be provided a display or viewing element 47a, such as a magnifying lens.

It will now be apreciated that light rays from the lamp 15a pass upward through light-permeable support element 27a, and are reflected from opposite sides of the article 32a to respective surfaces 40a and 42a. The refletive surfaces 40a and 42a are located on opposite sides of the article 32a, and reflect light rays received from the article generally horizontally to the additional light-reflective surface 44a. From the light-reflective surface 44a, the rays are reflected upward to the display means 47a. Of course, suitably mirrored surfaces, such as prisms, or other, may be employed for the light-reflective surfaces.

In the embodiment of FIGS. 5–7, opposite sides of the article 32a may be viewed simultaneously at the display element 47a, in generaly the same manner as in the first-described embodiment. Also, it will be understood that both the obverse and reverse faces of the article are seen in an optically erect condition, for ease and facility of examination.

In all embodiments of this invention, any of the reflective surfaces may be mirrors or prisms and may be made of acrylic resins such as poly (acrylate) or poly (methacrylate).

From the foregoing, it is seen that the present invention provides an article-viewing apparatus which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A viewing apparatus for stamps, coins and the like, comprising a housing, holder means mounted in said housing intermediate two surfaces thereof for holding an article in position to be viewed, means for illuminating opposite sides of an article in said holder means, a pair of reflective surfaces in said housing located to face obliquely toward respective sides of an article held by said holder means, one of said reflective surfaces comprising the first face of a first prism and the other of said reflective surfaces comprising the first face of a second prism, said reflective surfaces being in angularly disposed planes and being operable to reflect generally parallel rays from opposite sides of said article to provide erect images thereof, exhibit means carried by said housing, at least one additional reflective surface comprising the second face of one of said prisms, said additional reflective surface being disposed within said housing generally parallel to one of said pair of first mentioned reflective surfaces for directing light from the respective surfaces of said first-mentioned pair to said exhibit means, and said exhibit means being in position respectively relative to said reflective surfaces to present said erect images of said opposite article sides to an observer.

2. A viewing apparatus for stamps, coins and the like, comprising a housing, holder means mounted in said housing intermediate two surfaces thereof for holding an article in position to be viewed, means for illuminating opposite sides of an article in said holder means, a pair of reflective surfaces in said housing located to face obliquely toward respective sides of an article held by said holder means, one of said reflective surfaces comprising the first face of a first prism and the other of said reflective surfaces comprising the first face of a second prism, said reflective surfaces being in angularly disposed planes and being operable to reflect generally parallel rays from opposite sides of said article to provide erect images thereof, exhibit means carried by said housing, a pair of additional reflective surfaces comprising the second faces of said first and second prisms, respectively, said pair of additional reflective surfaces being disposed within said housing generally parallel to each other for directing light from the respective surfaces of said first-mentioned pair of reflective surfaces to said exhibit means, and said exhibit means being in position relative to said reflective surfaces to present said erect images of said opposite article sides to an observer.

3. A viewing apparatus according to claim 2, wherein said pair of additional reflective surfaces are in the same plane generally parallel to said one of said first-mentioned pair of reflective surfaces.

4. A viewing apparatus for stamps, coins and the like, comprising a housing, holder means mounted in said housing intermediate two surfaces thereof for holding an article in position to be viewed, means for illuminating opposite sides of an article in said holder means, at least a pair of reflective surfaces in said housing located to face obliquely toward respective sides of an article held by said holder means, one of said reflective surfaces comprising the first face of a first prism and the other of said reflective surfaces comprising the face of a second prism, said reflective surfaces being operable to provide erect images of said opposite sides or said article, exhibit means carried by said housing in position respectively relative to said reflective surfaces to present said erect images of said opposite article sides to an observer, said exhibit means comprising at least one magnifying lens generally parallel to the said holder means and said first prism being a rhomboidal prism and said second prism being a Porro prism, whereby the images of both the obverse and reverse sides of a coin or the like will be reflected to said magnifying lens in adjacent erect relationship.

References Cited

UNITED STATES PATENTS

| 1,391,807 | 9/1921 | Swalm et al. | |
| 2,219,458 | 10/1940 | Sohns. | |
| 2,877,580 | 3/1959 | Wiklund. | |
| 3,002,426 | 10/1961 | McCabe. | |
| 3,304,835 | 2/1967 | Weisner. | |
| 3,225,648 | 12/1965 | Toler | 353—81 XR |

FOREIGN PATENTS

| 218,207 | 10/1958 | Australia. |

NORTON ANSHER, Primary Examiner

R. P. GREINER, Assistant Examiner

U.S. Cl. X.R.

353—67, 81, 99